(12) United States Patent
Sparkes

(10) Patent No.: US 9,849,740 B2
(45) Date of Patent: Dec. 26, 2017

(54) TOWING ASSEMBLY

(71) Applicant: Vernon Sparkes, Calgary (CA)

(72) Inventor: Vernon Sparkes, Calgary (CA)

( * ) Notice: Subject to any disclaimer, the term of this patent is extended or adjusted under 35 U.S.C. 154(b) by 0 days.

(21) Appl. No.: 14/913,332

(22) PCT Filed: Aug. 22, 2014

(86) PCT No.: PCT/CA2014/050807
§ 371 (c)(1),
(2) Date: Feb. 19, 2016

(87) PCT Pub. No.: WO2015/024131
PCT Pub. Date: Feb. 26, 2015

(65) Prior Publication Data
US 2016/0297265 A1   Oct. 13, 2016

Related U.S. Application Data

(60) Provisional application No. 61/869,248, filed on Aug. 23, 2013.

(51) Int. Cl.
*B60D 1/18*   (2006.01)

(52) U.S. Cl.
CPC ............ *B60D 1/182* (2013.01); *B60D 1/187* (2013.01)

(58) Field of Classification Search
CPC ................................ B60D 1/182; B60D 1/187

USPC ......................................................... 280/480
See application file for complete search history.

(56) References Cited

U.S. PATENT DOCUMENTS

| | | | | |
|---|---|---|---|---|
| 3,923,171 A * | 12/1975 | Pragnell | ................... | B66C 1/18 182/190 |
| 5,308,101 A * | 5/1994 | Monty | ................... | B60D 1/182 267/74 |
| 6,050,587 A * | 4/2000 | Panhausen | ............... | B60D 1/18 280/480 |
| 7,306,253 B2 | 12/2007 | Markley | | |
| 7,845,669 B2 | 12/2010 | Yeh et al. | | |

\* cited by examiner

*Primary Examiner* — Joseph M Rocca
*Assistant Examiner* — Felicia L. Brittman
(74) *Attorney, Agent, or Firm* — Parlee McLaws LLP; Susan Rancourt

(57) ABSTRACT

The invention relates to a towing assembly that is used in towing operations to avoid damage or injury to persons when a soft tow apparatus, such as a tow strap, tow rope, or cable, fails during vehicle recovery operations. The assembly comprises: (a) a recovery strap that can be connected to a towing vehicle and a vehicle to be towed; (b) a diffuser strap that can be connected to a towing vehicle and a vehicle to be towed and (c) two or more sleeves disposed on the diffuser strap. The diffuser strap captures and dissipates the kinetic and potential energy that is released when the recovery strap breaks.

20 Claims, 7 Drawing Sheets

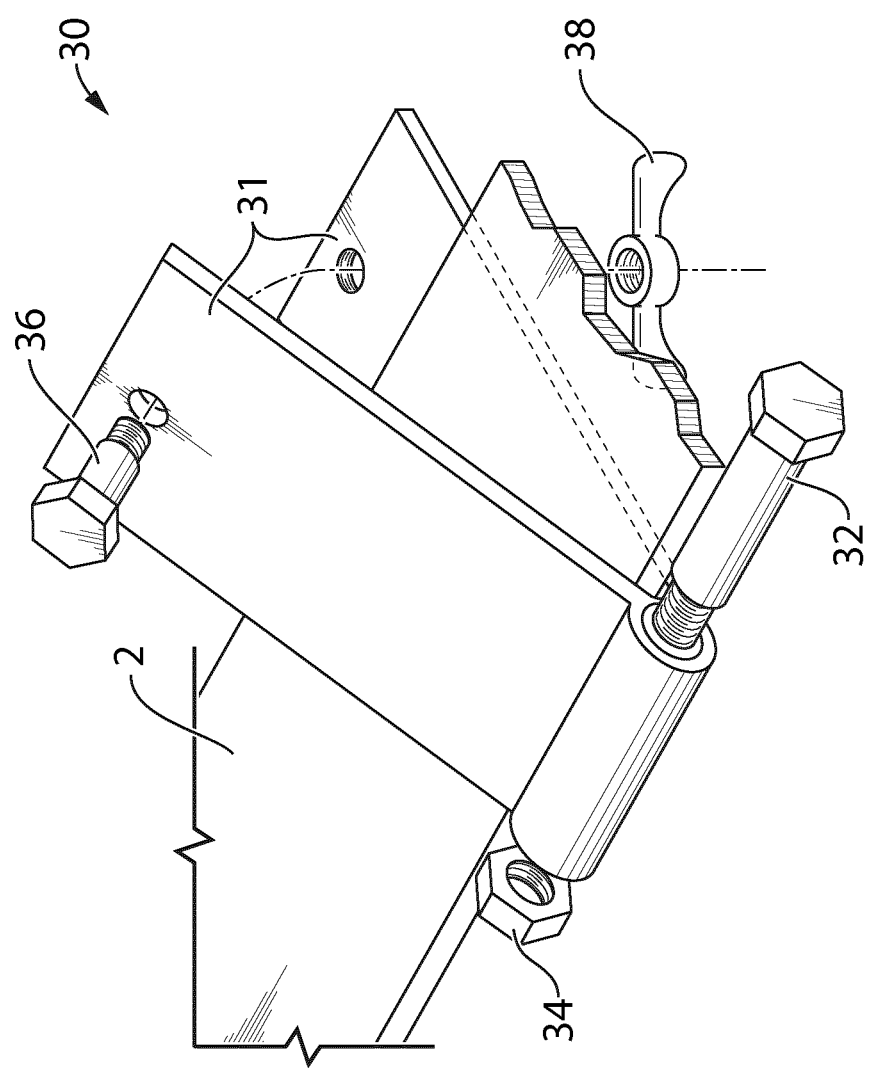

TOWING ASSEMBLY

FIELD

The invention described herein relates to a towing assembly disposed between a towing vehicle and a vehicle in need of being towed. The towing assembly comprises a recovery strap and a diffuser strap that is able to capture and absorb the stored energy released from the recovery strap, and to restrain the recovery strap, in the event that the recovery strap fails during a towing operation. The towing assembly is used to prevent injury to persons or damage to property when a recovery strap fails.

BACKGROUND

During the course of operating a vehicle, it may be necessary to tow the vehicle for one reason or another—for example if the vehicle were to break down, slide off the road into a ditch, to get stuck in mud, snow, sand or other types of terrain. In these situations, it is desirable to have a means of simply and safely dislodging the vehicle if it is stuck and towing it to a desired location (i.e. to a garage, back onto the road, etc.).

There is always a danger, particularly where the vehicle being towed or to be towed is heavy or firmly stuck, that the soft tow apparatus can snap or break at any of a number of points, when it experiences a shock load, or if the vehicle being towed is simply too heavy to move. For example, the soft tow apparatus might break along its length or at the connection of the soft tow apparatus to the vehicle, or where it is sewn, or the receivers on the vehicle, or parts of the receivers, to which the soft tow apparatus is attached may also be pulled off of the vehicle resulting in projectiles that can do a significant amount of damage to persons inside the vehicles or standing nearby, or to a vehicle or other property. In fact, individuals have been killed or severely injured when towing belts have broken, or when hooks, shackles, trailer balls, etc. have become dislodged.

Described in U.S. Pat. No. 7,871,097 is a pivoting hitch assembly that may be used in towing applications. As a safety measure, this hitch assembly may be used in combination with a towing strap that is designed to fail before anything else in the tow system breaks. Therefore, the receiver or other items will not become projectiles that can cause harm to persons or property. However, the risk remains when using such a towing system that the towing strap, which carries a significant amount of kinetic and potential energy when it breaks, could injure nearby persons or damage the vehicles nearby.

The prior art discloses previous efforts to minimize damage caused by the breaking of a tow strap. For example, U.S. Pat. No. 6,050,587 discloses a pulling arrangement disposed between a traction device and an object to be towed which includes a pulling device and a guide element operatively coupled to the pulling device for guiding fragments thereof when the pulling device fails. Fastening devices are disposed on the guide element for fastening the guide element, independently of the pulling device, to connecting elements of the traction device and of the object to be towed. The independent fastening of the guide element to the connecting elements of the traction device and of the object to be towed ensures uniform guidance of the pulling device being torn apart regardless of the breaking point on the pulling device.

As another example, U.S. Pat. No. 7,845,669 discloses a safety restraint for use with a towing assembly. The restraint includes an elongated, hollow body that receives the towing assembly. The elongated, hollow body is formed from at least two fibers that are woven into a multi-axis braid pattern, resembling a Chinese finger trap. The cylindrical body at least partially encapsulates the towing assembly. In the event of failure of the towing assembly or its components, the restraint's inner walls press inward on the encapsulated towing assembly to restrain or capture failed components.

U.S. Pat. No. 5,308,101, not directed to tow strap failures, discloses an elastically retractable tow strap used for towing one vehicle with a second vehicle. The heavy-duty tow strap is coupled with a second strap of elastic material at a number of points along the length of the recovery strap, such that the tow strap forms loops along the length of the elastic strap. The primary object of the invention is to provide an elastically retractable tow strap that will extend and retract in response to the changing distance between the two vehicles.

Disadvantages of the prior art above are that they that are either difficult to manufacture, difficult to use by consumers, or both.

There is a need for a towing apparatus that effectively absorbs all of the energy from the high velocity breaking soft towing apparatus, while still being easy to use by consumers and easy to manufacture.

SUMMARY

Described herein is a towing assembly that may be used during a towing operation, and which is designed to protect nearby persons and property in the event that the recovery strap fails, that is breaks, during a towing operation.

In one aspect, the invention is a towing assembly comprising:
 a) a recovery strap with a first end and a second end, said first end comprising a fastening element for connection to the connecting element of a towing vehicle or a vehicle to be towed, and said second end comprising a fastening element for connection to a connecting element of the other of the towing vehicle or the vehicle to be towed, and elongatable to a maximum length at failure;
 b) a diffuser strap with a first end and a second end, a left side and a right side, said first end comprising a fastening element for connection to the connecting element of the towing vehicle or the vehicle to be towed and said second end comprising a fastening element for connection to the connecting element of the other of the towing vehicle or the vehicle to be towed; and
 c) one or more sleeves disposed on the diffuser strap, sized to accept insertion of the recovery strap therethrough;
 wherein the diffuser strap in its resting state is longer than the maximum length, or wherein the diffuser strap is elongatable beyond the maximum length.

In one embodiment, the diffuser strap in its resting state is longer than the maximum length.

In one embodiment, the fastening elements of the recovery strap and the diffuser strap are loops formed at the ends of said recovery strap or said diffuser strap. In one embodiment two or more non-overlapping sleeves are disposed on the diffuser strap.

In one embodiment the sleeves are affixed to the diffuser strap. In one embodiment the sleeves are affixed to the recovery strap. In another embodiment the sleeves are loops formed from the diffuser strap by folding the strap onto itself. The at least two sleeves may extend from the same side of the diffuser strap or they may extend from different sides of the diffuser strap, alternating from said left side to said right side along the length of the strap. In yet another embodiment the sleeves can be opened and closed, and the recovery strap is placed into the open sleeves, and then the sleeves are closed around the recovery strap. These at least two sleeves may comprise VELCRO to hold the sleeve closed.

The recovery strap, diffuser strap and/or sleeves may be made of polyamide (nylon).

In another aspect, the invention is a method of towing a vehicle in need of being towed, said method comprising:
 a) providing a towing assembly as described above,
 b) inserting the recovery strap through the sleeves disposed along the length of the diffuser strap;
 c) attaching the fastening element of the first end of the recovery strap to a connecting element of one of the vehicle or a towing vehicle;
 d) attaching the fastening element of the second end of the recovery strap to a connecting element of the other of the vehicle or the towing vehicle;
 e) attaching the fastening element of the first end of the diffuser strap to the connecting element of the vehicle or the towing vehicle;
 f) attaching the fastening element of the second end of the diffuser strap to the connecting element of the other of the vehicle or the towing vehicle; and
 g) towing the vehicle.

In one embodiment of the method, the fastening elements of the diffuser strap are positioned over the fastening elements of the recovery strap in the connecting element.

In one embodiment of the method, at least two sleeves are disposed on the diffuser strap, and in step (b) of the method the recovery strap is inserted through a first sleeve disposed at an end of the diffuser strap, and the recovery strap is then coiled around said diffuser strap before inserting said recovery strap through each consecutive sleeve disposed on the diffuser strap. In one embodiment of the method, the one or more sleeves can be opened and closed, and the recovery strap is inserted into the sleeves by opening the sleeves, positioning the recovery strap into the sleeves and then closing the sleeves around the recovery strap.

In another aspect, the invention is a method of towing a vehicle in need of being towed, said method comprising:
 a) providing a towing assembly as described above;
 b) attaching the fastening element on the first end of the recovery strap to a connecting element of the vehicle or a towing vehicle;
 c) attaching the fastening element on the second end of the recovery strap to a connecting element of the other of the vehicle or the towing vehicle;
 d) attaching the fastening element of the first end of the diffuser strap to the connecting element of the vehicle or the towing vehicle;
 e) attaching the fastening element on the second end of the diffuser strap to the connecting element of the other of the vehicle or the towing vehicle;
 f) wrapping and securing the sleeves around the recovery strap; and
 g) towing the vehicle.

In one embodiment of this method, the fastening elements of the diffuser strap are positioned over the fastening elements of the recovery strap.

In another aspect, the invention is a towing assembly comprising:
 a) a recovery strap, with a first end and a second end, said first end comprising a loop for connection to a connecting element of a towing vehicle or a vehicle to be towed, and said second end comprising a loop for connection to a connecting element of the towing vehicle or the vehicle to be towed, and elongatable to a maximum length at failure;
 b) a diffuser strap, that is longer than the maximum length, and that comprises a first end and a second end, a left side and a right side, said first end comprising a loop for connection to the connecting element of the towing vehicle or the vehicle to be towed and said second end comprising a loop for connection to the connecting element of the towing vehicle or the vehicle to be towed; and
 c) at least four sleeves disposed on the diffuser strap, said sleeves being sized to accept insertion of the recovery strap therethrough.

The recovery strap, diffuser strap, or both, may be made of nylon. In one embodiment the at least four sleeves are disposed every four to five feet along the length of the diffuser strap. In one embodiment the at least four sleeves extend from the same side of the diffuser strap. The recovery strap may be inserted through the sleeves to lie in parallel arrangement with the diffuser strap.

In another embodiment the at least four sleeves extend from different sides of the diffuser strap, alternating from said left side to said right side along the length of the diffuser strap. The recovery strap may be inserted through consecutive sleeves on the diffuser strap, so that the recovery strap crosses over the diffuser strap between each pair of sleeves.

Alternatively, the recovery strap may be inserted through consecutive sleeves on the diffuser strap, so that the recovery strap wraps around the diffuser strap between each pair of sleeves.

In another aspect the invention is a method of towing a vehicle in need of being towed, said method comprising:
 a) providing a towing assembly as described above,
 b) threading the recovery strap through the four or more sleeves disposed along the length of the diffuser strap;
 c) attaching the loop of the first end of the diffuser strap to a connecting element of one of the vehicle or a towing vehicle;
 d) attaching the loop of the second end of the diffuser strap to a connecting element of the other of the vehicle or the towing vehicle;
 e) attaching the loop of the first end of the recovery strap to the connecting element of the vehicle or the towing vehicle, so that the loop of the first end of the recovery strap is under the loop of the diffuser strap;
 f) attaching the loop of the second end of the recovery strap to the connecting element of the other of the vehicle or the towing vehicle so that the loop of the second end of the recovery strap is under the loop of the diffuser strap; and
 g) towing the vehicle.

BRIEF DESCRIPTION OF THE DRAWINGS

FIG. 6 is a perspective view of a strap grabber disposed on a recovery strap.

DETAILED DESCRIPTION

Described herein is a towing assembly that may be used during a towing operation, and which is designed to protect nearby persons and property in the event that the recovery strap breaks. The towing assembly is disposed between a towing vehicle and a vehicle in need of being towed. It comprises a recovery strap and a diffuser strap, each of which attach independently to the towing vehicle and the vehicle being towed. The diffuser strap further comprises a series of sleeves disposed along its length. The sleeves are sized to accept the recovery strap, which may be inserted through the consecutive sleeves so that the recovery strap and the diffuser strap are arranged in parallel alignment.

In use, the recovery strap is the only strap in the towing assembly that is subjected to significant towing forces. When a recovery strap made of synthetic material such as nylon or polyester is used, the recovery strap will elongate during the towing operation (nylon elongates about 8% and polyester about 2%). Accordingly, in order to ensure that no, or substantially no, towing forces are applied to the diffuser strap, the diffuser strap in its resting state may be longer than the maximum length to which the recovery strap can be elongated, immediately before it fails. In another embodiment, the diffuser strap may be the same length as, longer or shorter than the recovery strap when both are in their resting state, but the diffuser strap is capable of elongating to a length that is longer than the maximum length to which the recovery strap can be elongated, immediately before it fails. Therefore again, in this embodiment, no, or substantially no, towing forces are applied to the diffuser strap.

When the recovery strap fails, it possesses a great deal of potential energy, which is released as kinetic energy. It is this stored energy that results in the recovery strap, when it breaks, causing injury or damage to persons or property. The series of sleeves along the length of the diffuser strap function to trap and deplete this energy from the recovery strap in increments, and to restrain the recovery strap to keep it from swinging around and injuring persons or damaging property.

The towing assembly is able to capture the energy from a broken recovery strap regardless of where along its length the recovery strap breaks. For tension loads the strap will generally break at the junction of the loop formed at the end of the strap (i.e., where the end of the strap is stitched to the strap to form a loop), and for shock loads the strap will generally break in the middle of the strap.

Reference will now be made to FIGS. 1-7, which show various embodiments of the towing assembly. The towing assembly disclosed herein is useful for towing a vehicle with a second vehicle while minimizing the ability of the recovery strap to cause damage to property or persons should it fail.

Figure 1:
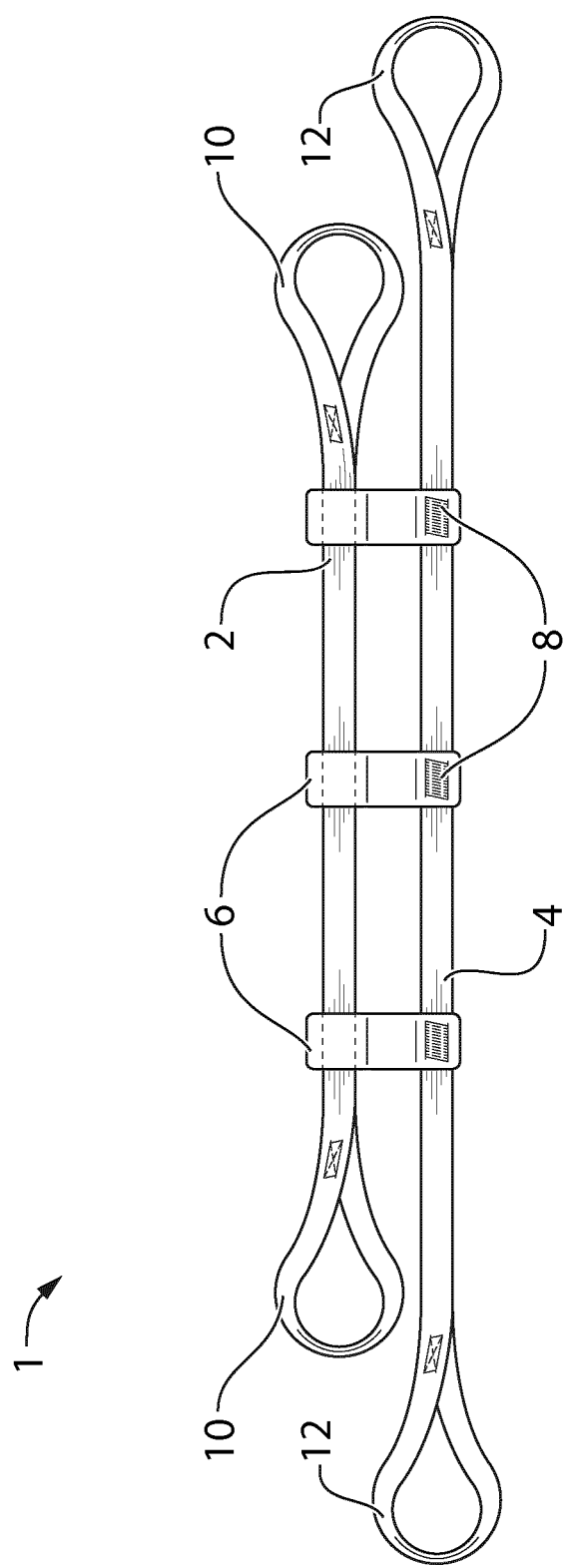
FIG. 1 is a perspective view of one embodiment of the towing assembly.
Figure 2:
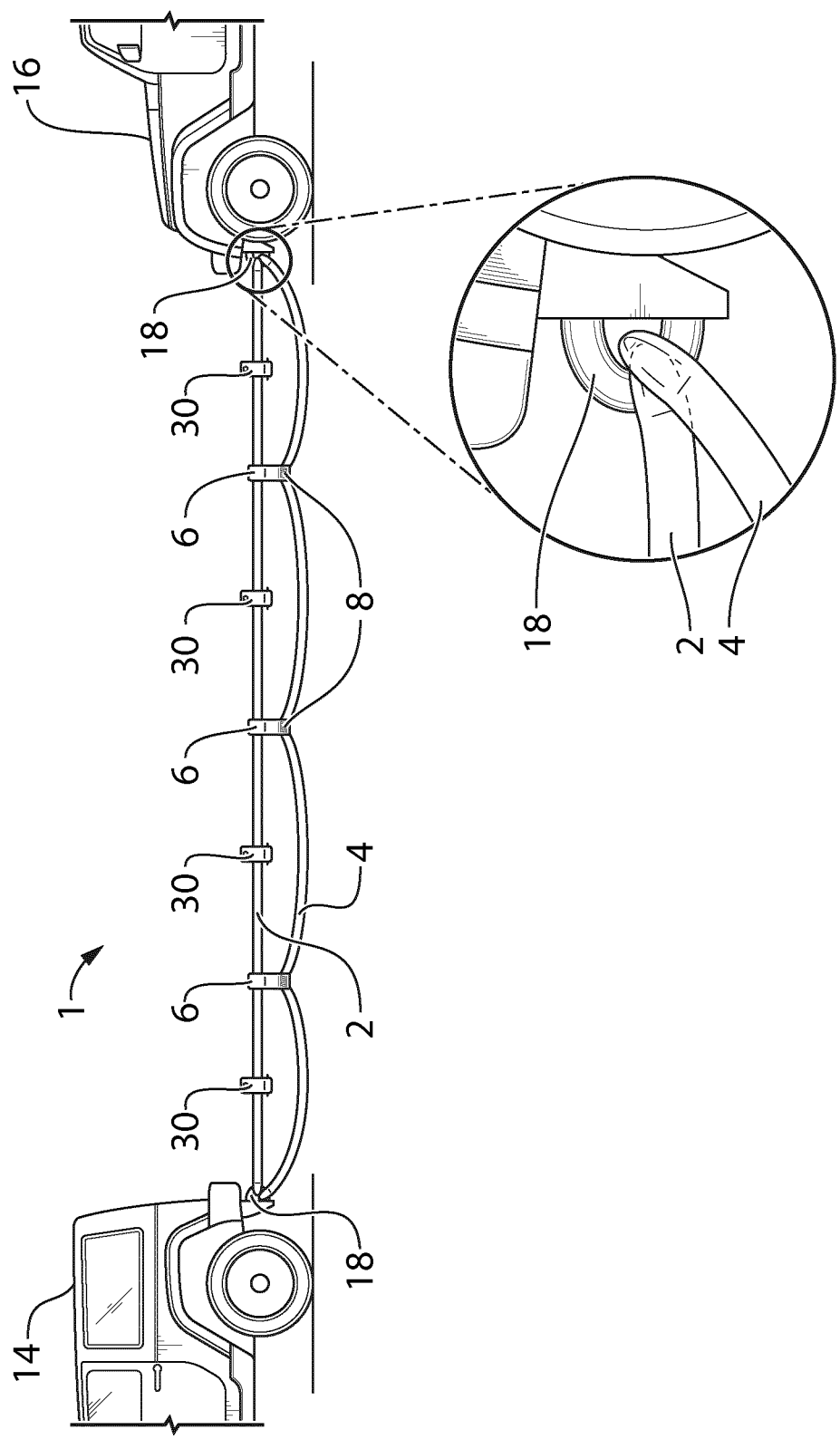
FIG. 2 is a perspective view of the embodiment of the towing assembly of FIG. 1 disposed between the towing vehicle and vehicle to be towed.
Figure 3:
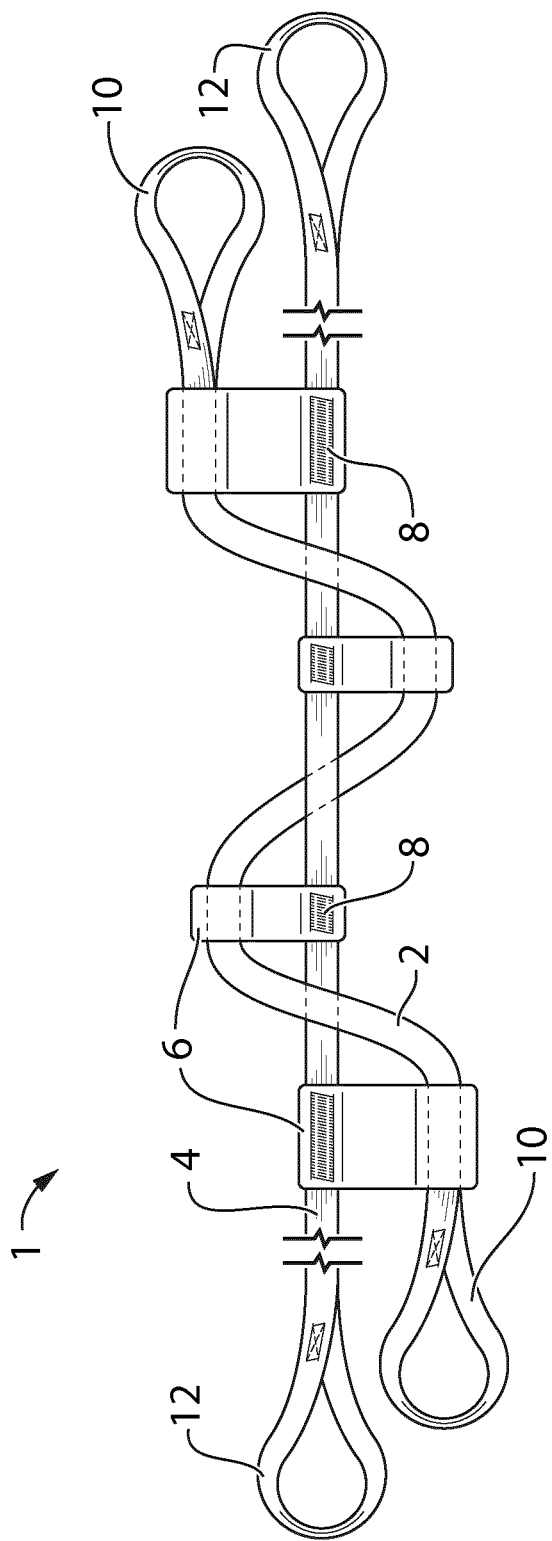
FIG. 3 is a perspective view of an alternative embodiment of the towing assembly, in which the sleeves are disposed on alternating sides of the diffuser strap.
Figure 4:
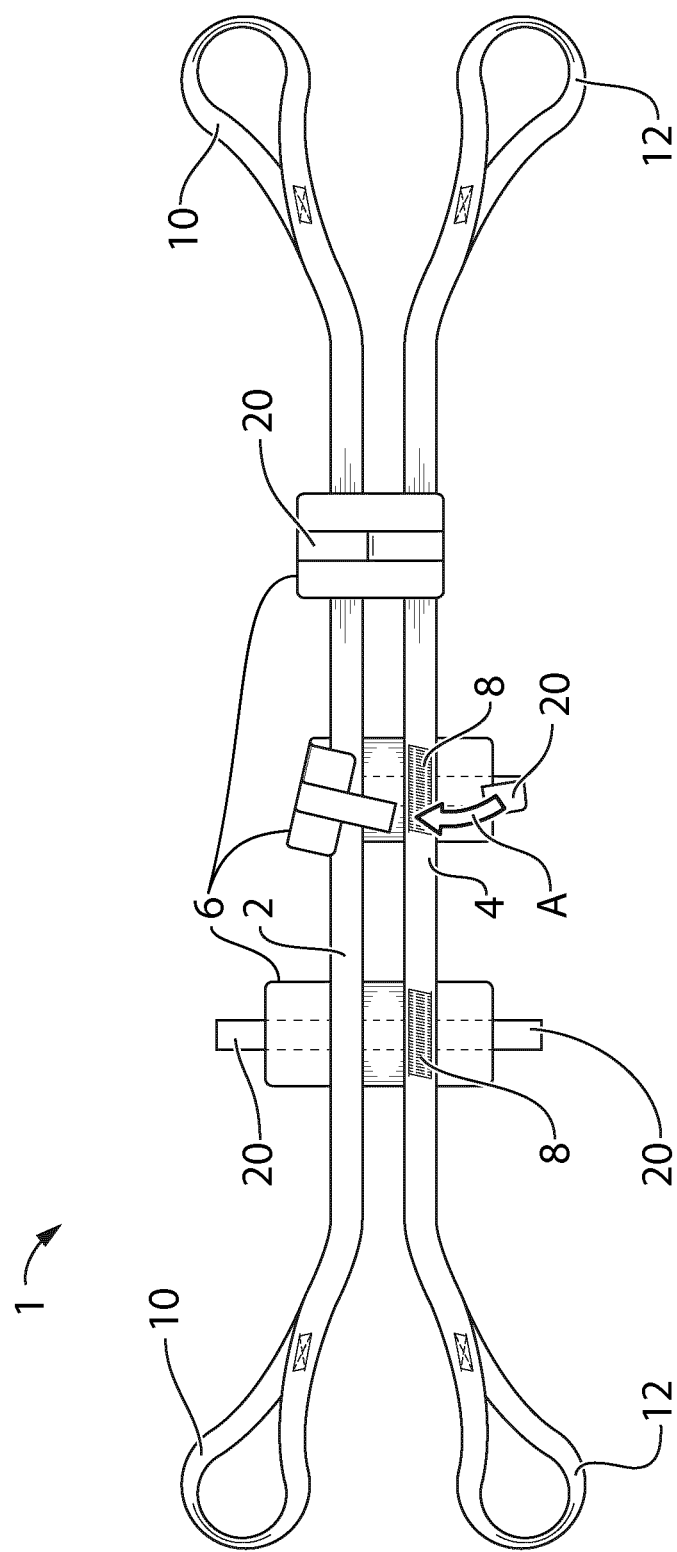
FIG. 4 is a perspective view of an alternative embodiment of the towing assembly in which the sleeves are attached to the diffuser strap and are opened and closed using VEL-CRO®.

The towing assembly 1 comprises two straps—a recovery strap 2 and a diffuser strap 4—both of which at their ends include fastening elements. The fastening elements allow connection of the straps to the connecting element of each vehicle. Separate fastening of the recovery strap and the diffuser strap to the connecting elements ensures that the diffuser strap will remain securely fastened between the tow vehicle and the vehicle being towed when the recovery strap fails. As shown in FIGS. 1 to 3, the diffuser strap 4 may be longer than the recovery strap 2, and further may comprise at least two sleeves 6 disposed along the length of the diffuser strap 4. As shown in FIG. 4, the diffuser strap 4 may be the same length or approximately the same length as the recovery strap 2. During the towing operation, the diffuser strap 4 is subject to no, or minimal (compared to the towing forces on the recovery strap), towing forces and remains intact when the recovery strap fails. Each sleeve disposed along the length of the diffuser strap 4 absorbs energy that is released when the recovery strap fails, and these sleeves collectively, with the diffuser strap, absorb and diffuse the kinetic and potential energy released from the failure of the recovery strap. Thus, by slowing down the high velocity recovery strap, and by restraining its movement, the diffuser strap prevents adjacent property from being damaged or persons from being injured.

FIG. 1 shows one embodiment of the towing assembly. The towing assembly 1 includes a recovery strap 2. The recovery strap 2 includes a fastening element 10 at each of its respective ends. The fastening element 10 may comprise loops made by folding the recovery strap 2 over and stitching the end of the recovery strap to itself, or may be hooks, shackles, or any other means of fastening the end of a recovery strap to a vehicle. The fastening elements allow connection of the recovery strap to the connecting elements 18 of the towing vehicle 14 and the vehicle to be towed 16. Well known connecting elements of vehicles include hitch assemblies in receivers, frame-fastened tow hooks, steel loops on trailer hitches, bumpers, or other secure attachment points on vehicles.

Recovery strap 2 is a flexible element, and may be made of any of a number of materials including synthetic and natural polymeric materials for example, nylon, polyester, polypropylene, polyethylene, KEVLAR® and thermoplastics. Additionally belts and ropes using these plastics could be used in combination and also could incorporate some metal, plastic or carbon fibres for additional energy absorption. Recovery straps typically include ropes, chains, cables and belts. Belts and ropes are preferred for use in the towing assembly described herein.

The towing assembly further includes a diffuser strap 4 with sleeves 6 that are disposed along the length of the diffuser strap. The diffuser strap 4 includes fastening elements 12 at each of its respective ends. The fastening elements 12 may comprise loops made by folding the diffuser strap 4 over and stitching the end of the strap to itself. The loops allow a connection of the diffuser strap 4 to the connecting elements 18 of the towing vehicle 14 and the vehicle to be towed 16.

Diffuser strap 4 is sized so that, during the towing operation, it is subjected to minimal, or no, towing forces. In one embodiment, diffuser strap 4 in a resting or nonelongated state, is longer than the recovery strap 2 in a resting or nonelongated state, and it is longer in a resting or nonelongated state than the maximum length to which the recovery strap 2 can elongate, before it fails. In this embodiment the diffuser strap is sufficiently long so that, before the recovery strap fails, the diffuser strap connected thereto is not subjected to any towing forces.

In another embodiment, diffuser strap 4 in a resting or nonelongated state is longer, the same length as, or even shorter than, recovery strap 2 in a resting or nonelongated state. However, in this embodiment the diffuser strap is capable of greater elongation than the recovery strap. For example, nylon elongates by about 8% and polyester about 2%. If these materials are used to make the recovery strap, the diffuser strap in the towing assembly may be made of a rope or other material that could elongate by about 30% or more (e.g., Master Pull Super Yanker™ Kinetic Recovery Rope to which sleeves 6 are attached). Since the diffuser strap 4 is therefore capable of greater elongation than the recovery strap 2, the diffuser strap does not break before the recovery strap fails, and indeed it can elongate to a length that is longer than the maximum length to which the recovery strap 2 can elongate, before it fails.

As is apparent therefore, in some embodiments the diffuser strap will be subjected to minimal towing forces, in comparison to the towing forces experienced by the recovery strap. In other embodiments the diffuser strap will not be subjected to any towing forces. The diffuser strap may therefore be longer than the recovery strap when both are in their resting state and longer than, or elongatable beyond, the length of the recovery strap at failure. Or, the diffuser strap is the same length or shorter than the recovery strap when both are in their resting state and it is elongatable beyond the length of the recovery strap at failure.

The function of the diffuser strap 4 is to restrain the recovery strap and to absorb and diffuse the kinetic and potential energy of the broken recovery strap. In some embodiments, this can be achieved even if the diffuser strap is subjected to minimal towing forces. Energy absorption by the diffuser strap occurs as a result of elastic elongation (an area under the load-elongation response of the diffuser strap), plastic elongation including up to fracture, and friction. Friction occurs as a result of the movement of the broken recovery strap through the sleeves and the controlled whipping action of the recovery strap with the air. The elongation of the diffuser strap would result in some energy absorption. The use of an elastomeric material and of metal fibers woven into the rope or belt (such as aluminum) would increase the amount of energy that is absorbed by elongation.

Diffuser strap 2 is a flexible element, and may be made of any of a number of materials including synthetic and natural polymeric materials for example, nylon, polyester, polypropylene, polyethylene, KEVLAR®, and elastomeric materials in addition to thermoplastics, for example. Diffuser straps typically include ropes, chains, cables and belts. Belts and ropes are preferred for use in the towing assembly described herein.

Sleeves 6 are disposed on and along the length of the diffuser strap 4. The sleeves are preferably sized so that the recovery strap can be inserted through the sleeves and slide within them. In one embodiment, the sleeves are affixed to the diffuser strap. In another embodiment the sleeves are movable along the length of the diffuser strap. In yet another the sleeves are formed from the diffuser strap. The sleeves preferably should not restrict longitudinal movement of the recovery strap, and accordingly are preferably large enough so that when the recovery strap fails it can slide within and between the multiple sleeves.

In one embodiment the sleeves 6 are affixed to the diffuser strap 4. In one embodiment, the sleeves 6 are formed by affixing a rectangular piece of polymeric woven material made for example from nylon or polyester, to the top of the diffuser strap 4 and then wrapping the material around and affixing it to the bottom of the diffuser strap 4. The sleeves may be affixed by stitching 8 the material to the top and bottom of the diffuser strap. The openings of said sleeves 6 are preferably wide enough so that the recovery strap 2 can be inserted easily through each sleeve. Sleeves may be affixed to the diffuser strap using any number of means, including glue, VELCRO, snaps or buckles.

Affixing of the sleeves to the diffuser strap, as opposed to the recovery strap, is preferred. However, in some embodiments the sleeves may be affixed to the recovery strap, for example by stitching. In these embodiments care must be taken to ensure that the stitching, or other means of affixing the sleeves, does not unduly compromise the towing capabilities of the recovery strap.

Figure 5A:
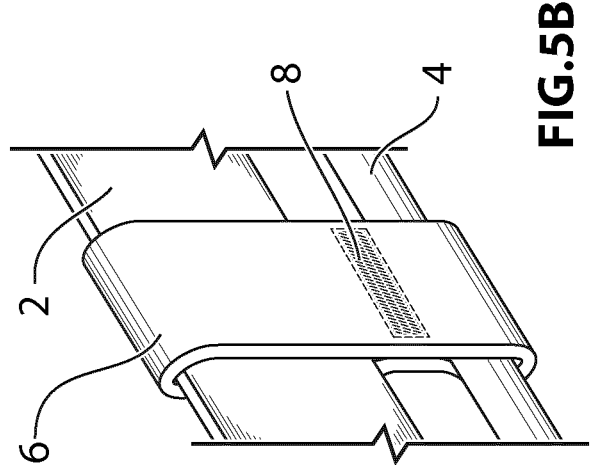
FIGS. 5A and B are perspective view of alternative embodiments of the recovery strap, diffuser strap and sleeves, in which the sleeves are moveable along both the recovery strap and diffuser strap.
Figure 5B:
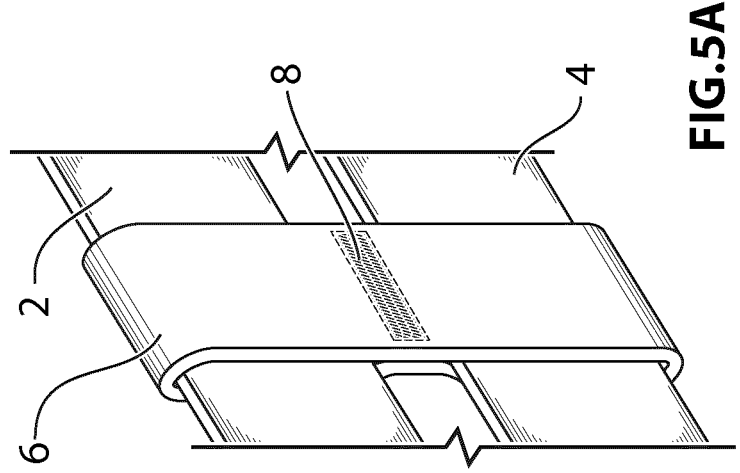

Other embodiments of the sleeves 6 are shown in FIG. 5. These sleeves differ from the embodiments shown in the other Figures in that they are not attached to diffuser strap 4, but rather are able to slide onto and move along the diffuser strap. They may be sized to slide onto diffuser strap 4 before or after the fastening elements 12 are formed at the ends of the diffuser strap. The sleeves 6 likewise slide onto recovery strap 2, as shown for the embodiments of the sleeves shown in FIG. 1 or 3. These embodiments of sleeves 6 may be formed from a nylon strap that has been cut into pieces, folded over and stitched onto itself to leave a space for the recovery strap and the diffuser strap. As shown in FIGS. 5A and B, the openings for the recovery strap and diffuser strap need not be the same size, and are in fact sized to accommodate the respective straps. For example, in FIG. 5B, diffuser strap 4 is a rope and recovery strap 2 is a strap, and the openings for the diffuser strap and recovery strap are accordingly of very different sizes.

Figure 7:
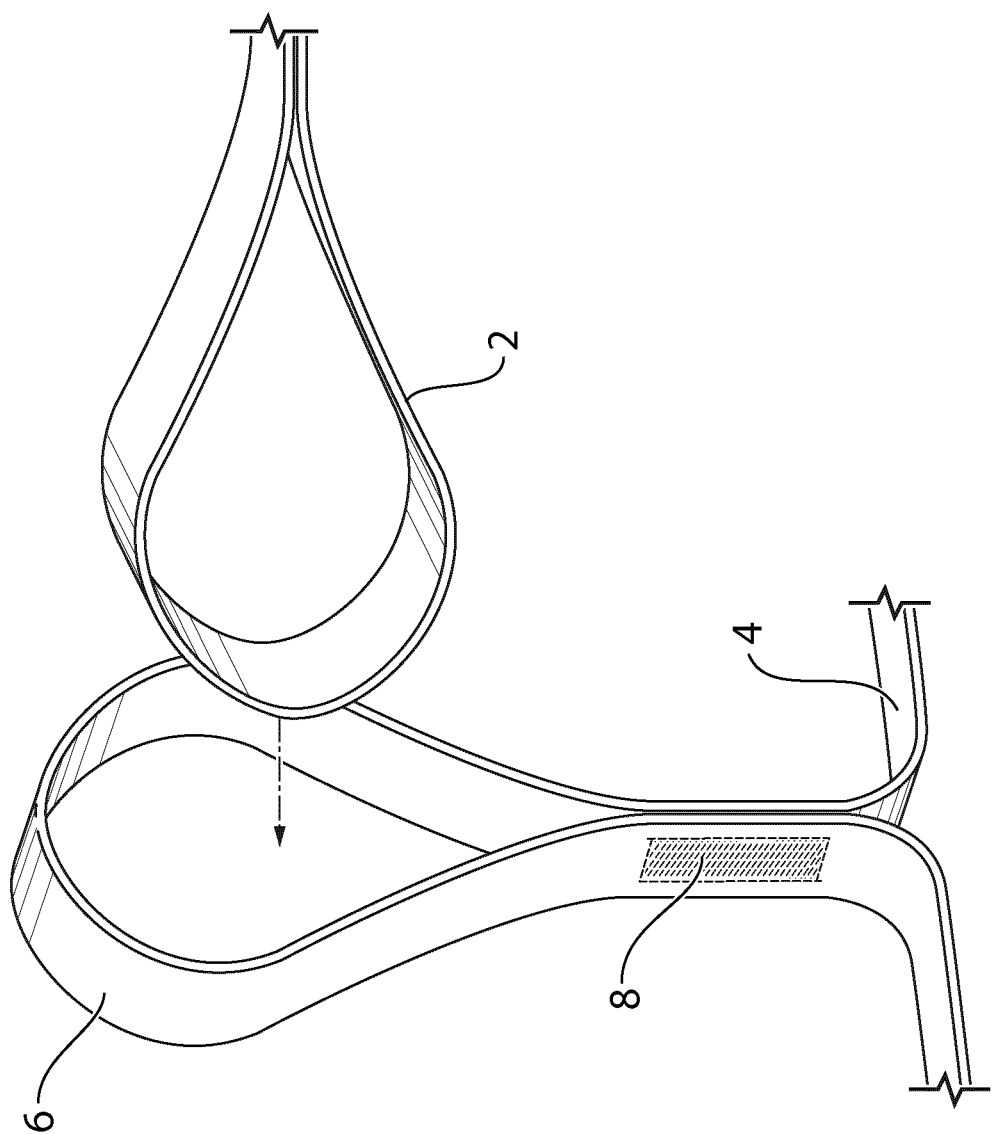
FIG. 7 is a perspective view of an alternative embodiment of the recovery strap, diffuser strap and sleeves, in which the sleeves are formed from the diffuser strap.

In another embodiment, shown in FIG. 7, sleeves 6 are formed from the diffuser strap 4, itself. As shown in FIG. 7, sleeve 6 may be formed by sewing loops into the webbing material of the diffuser strap by looping the diffuser strap out and stitching 8 it to itself. These loops are sized to fit insertion of the recovery strap 2 therethrough. The loops of the diffuser strap may be formed in other ways, for example, by knotting the diffuser strap (e.g., if it is a rope) or by attachment of clamps to the diffuser strap at regular intervals.

While sleeves made of polymeric woven material are preferred for use in the towing assembly described herein, sleeves made of other materials may be used. For example, leather, rubber, metal or polymeric (plastic) sleeves or rings that are large enough to accept the recovery strap may be affixed to or around the diffuser strap along its length. The function of the sleeves in the towing assembly described herein is to absorb and dissipate the kinetic and potential energy of the recovery strap when it fails, and to restrain the recovery strap when it breaks.

The number of sleeves disposed on the diffuser strap, and their spacing, will depend on the length of the strap. It cannot be anticipated with certainty where the recovery strap will break along its length. It may break at the loop 10, near the loop, or anywhere along its length. The sleeves are sized and positioned along the length of the diffuser strap to ensure that they will restrain the recovery strap, and assist in the capture and dissipation of the energy that is released, wherever along its length the recovery strap breaks. The more sleeves that are used, the greater is the probability that a sleeve will be positioned near the point where the recovery strap breaks, which is preferred. As a general rule, the greater the number of sleeves on the diffuser strap, the smaller each individual sleeve may be. Most preferably the sleeves cover, in their totality, less than 5%, or less than 10%, of the length of the recovery strap. However, in some embodiments the sleeves may cover up to 25%, or up to 50% or even up to 75% of the length of the recovery strap, depending upon the number and size of the sleeves used and the length of the recovery strap.

At least one sleeve 6 is disposed on the diffuser strap. However, in a preferred embodiment, two or more non-overlapping sleeves 6 are spaced along the length of the diffuser strap 4. Preferably more than three non-overlapping sleeves are used, and even more preferably four, six, or more non-overlapping sleeves are used. Generally, the sleeves are spaced one to six, two to five, three to four, or four to five, feet apart along the length of the diffuser strap. The sleeves on any one diffuser strap need not be the same width. For example, in some embodiments the sleeves that are closer to the ends of the strap may be wider than those in the centre of the straps, as shown for example in FIG. 3.

In one embodiment, the sleeves are 8 inches wide, formed from a nylon strap that has been cut into pieces and stitched onto the diffuser strap.

In a preferred embodiment, the towing assembly, including the recovery strap 2, the diffuser strap 4, the sleeves 6, and stitching, are made of nylon.

FIG. 2, shows a recovery strap assembly 1 connected to the connecting elements 18 of the towing vehicle 14 and vehicle to be towed 16. Before connecting the straps to the vehicles, recovery strap 2 may be threaded through each sleeve 6. The recovery strap 2 and diffuser strap 4 may then be connected by their respective fastening elements to the vehicles. To ensure that the diffuser strap 4 is not subjected to any towing forces throughout the towing operation, the recovery strap loop may be cradled inside the loop of the diffuser strap when connecting said loops to the connecting elements of the towing vehicle 14 and vehicle to be towed 16, so that the loop of the recovery strap is positioned over the loop of the diffuser strap when in the connecting element 18 (see expanded drawing in FIG. 2). In this way the loop of the diffuser strap is not damaged by the forces to which the recovery strap is subjected. In another preferred embodiment, the loop of recovery strap 2 may be positioned beside the loop of diffuser strap 4, in connecting element 18.

FIG. 3 shows another embodiment of the towing assembly 1 described herein. In this embodiment, similar to the embodiment of FIG. 1, sleeves 6 are disposed along the length of the diffuser strap 4. However, the sleeves are affixed to the diffuser strap so that they extend from alternate sides of the diffuser strap. For example, the first sleeve 6 extends from the left side of the diffuser strap 4 (left being the bottom of the strap shown in FIG. 3) then the next sleeve extends from the right side of the diffuser strap (right being the top of the strap shown in FIG. 3). The sleeves 6 alternate in such a manner along the length of the diffuser strap 4. The recovery strap 2 is inserted through the first sleeve 6, and then extends across the diffuser strap 4 to be inserted through the second sleeve 6; it then extends back across the diffuser strap 4 and is inserted through the third sleeve 6, and so on. Once the recovery strap 2 is fed through all of the sleeves 6 in a similar manner, the recovery strap 2 and diffuser strap 4 may be connected to the connecting elements of the towing vehicle 14 and vehicle to be towed 16 as in the above embodiment. In an alternative embodiment, the recovery strap 2 is inserted through the first sleeve 6 and then wrapped entirely around the diffuser strap 4, before insertion through the second sleeve 6, and so forth.

The advantage of using the embodiment of FIG. 3 is that the contact area between the recovery strap and the diffuser strap is increased, thereby resulting in the generation of more friction between the two straps, should the recovery strap fail. This increased friction will increase the rate of absorption of energy from the recovery strap when it breaks. In an alternative embodiment, the recovery strap 2 can be wrapped entirely around the diffuser strap 4, before it is inserted into the next sleeve, and this can be done when the sleeves are on the same side of the diffuser strap.

FIG. 4 shows another embodiment of the towing assembly 1 described herein. In this embodiment, sleeves 6 can be opened and closed, so that rather than being inserted through the sleeves, recovery strap 2 can be placed on the sleeves 6, and then the sleeves wrapped around the recovery strap and their free edges secured together. FIG. 4 shows 3 sleeves, two in their open configuration, to show the stitching 8 used to secure the sleeves to the diffuser strap. VELCRO™ strap 20, which is used to secure the free edges together in this embodiment, is a strap secured around the outside of the sleeve. Recovery strap 2 is laid on top of the sleeves and the sleeves are folded up along arrow A to surround the recovery strap, and then secured around the recovery strap using the VELCRO. Other means of securing the free edges of the sleeve 6 together, for example, zippers or buckles, may be used.

Towing assembly 1 may be packaged as a kit comprising all parts of the apparatus, the recovery strap, the diffuser strap and the sleeves. In this kit the recovery strap may be inserted through the sleeves, or it may not be inserted, and may later be assembled with the diffuser strap at the towing site. Alternatively, a kit that is designed to retrofit an existing recovery strap, said kit comprising only the diffuser strap and the sleeves, may be packaged. This diffuser strap and the sleeves are then assembled with the existing recovery strap, to form the towing assembly described herein. Alternatively again, the sleeves may themselves be packaged alone, and sized to fit over an existing recovery strap and diffuser strap. All kits would include instructions regarding the assembly and use of the sleeves, diffuser strap and recovery strap when assembled into the towing assembly 1 described herein.

Towing assembly 1 may additionally comprise devices that are disposed on the recovery strap 2, and that prevent the recovery strap from passing through the sleeves 6, on the diffuser strap 4. An example of this type of device is shown in FIG. 6. FIG. 6 shows a clamp 30 that comprises plates 31 that are pivotally connected by a pin or screw 32 which is secured by nut 34. The clamp fits over recovery strap 2 and is affixed thereto by tightening a second screw 36 and wingnut 38. Clamp 30 is affixed to the recovery strap between sleeves 6, and is larger than the opening in the sleeves. Thus, if the recovery strap breaks, clamp 30 will prevent the strap from passing through the sleeves. Clamp 30 may be made of metal, plastic, rubber, leather or a combination of these.

EXAMPLES

The following are representative examples of the use of an embodiment of the towing assembly described herein.

The below examples illustrate various embodiments of the towing assembly's performance when it was load tested for up to 19,000 lbs. The towing assembly, as in the above described embodiments, comprises a recovery strap, a diffuser strap, and sleeves disposed along the length of the diffuser strap.

The recovery straps used in these tests were 2 inches wide and 25 feet long. The first and second ends of the recovery straps had fastening elements comprised of loops. The loops were formed by folding the recovery straps over and stitching them to themselves. The loops allowed connection of the recovery straps to the connecting elements of both the towing vehicle and the vehicle to be towed. The recovery straps were made of nylon and could elongate by 8% or more.

The diffuser straps used in these tests were 2 inches wide and 30 feet long. The ends of the diffuser straps had fastening elements comprised of loops, which were formed by folding the diffuser straps over and stitching them to themselves. The loops allowed connection of the diffuser straps to the connecting elements of the towing vehicle and the vehicle to be towed. The diffuser straps were made of nylon.

Six sleeves were stitched to the diffuser straps. The sleeves were either stitched to extend from the same side of the diffuser strap, or stitched so that they would extend from alternating sides of the diffuser strap. The sleeves were 8-inches in length and wide enough to allow the 2-inch recovery straps to pass easily therethrough. Further, the sleeves were evenly spaced down the length of the diffuser straps. The sleeves and stitching were made of nylon webbing material.

The recovery straps were threaded through the first sleeve stitched to the diffuser straps. In embodiments where the sleeves extended from the same side of the diffuser strap, the recovery strap was threaded through the consecutive sleeves so that it laid in parallel arrangement with the diffuser strap. In other tests, the recovery strap was coiled around the diffuser strap and then threaded through the second sleeve, and was then again coiled around the diffuser strap and then threaded through the third sleeve, and so forth.

In embodiments where the sleeves were stitched to alternate sides of the diffuser strap, after threading the recovery strap through the first sleeve, the recovery strap was in some tests passed across the diffuser strap and other tests, coiled around the diffuser strap and then threaded through the second sleeve. The recovery strap was coiled around/passed over the recovery strap, and fed through each consecutive sleeve in the manner described above until it was threaded through all sleeves.

After assembly, both the recovery strap and diffuser strap were connected to the connecting elements of the towing vehicle and the vehicle to be towed. The loops of the recovery straps were cradled inside the loops of the diffuser straps. Once the loops were connected properly to the connecting element of each vehicle, the towing vehicle began pulling the vehicle to be towed.

In the tests, the towing vehicle accelerated suddenly and forcefully, causing the recovery straps to break. Typically, when the recovery strap breaks, it snaps back at a high velocity potentially causing damage to property or injury to persons. However, in the tests, the recovery straps were restrained by the diffuser straps, and more particularly the sleeves on the diffuser straps. In essence, each sleeve, individually, trapped some of the energy from the breaking recovery straps, and the sleeves and diffuser straps, collectively, trapped all of the energy released from the breaking recovery straps. By trapping all of the energy from the broken recovery straps, and by restraining the straps, the towing assembly was able to avoid property damage and personal injury when the recovery straps broke.

Example 2

The recovery strap was 2" wide, 8 feet long, and made of nylon. It could elongate about 8% before breaking. The first and second end of the recovery strap had a fastening element comprised of a loop.

The diffuser strap used in this test was a ½" wide nylon rope that was 10 feet long. Each end of the rope had a fastening element comprised of a loop.

Three sleeves were slid over the diffuser strap and the recovery strap. The sleeves and stitching were made of nylon webbing material.

When sufficient force was applied to the recovery strap to cause it to break, the recovery strap was restrained by the diffuser strap (rope).

While the towing assembly has been described in conjunction with the disclosed embodiments and examples, it will be understood that the towing assembly is not intended to be limited to these embodiments and example. On the contrary, the towing assembly is intended to cover alternatives, modifications, and equivalents, which may be included within the spirit and scope of the towing assembly as defined by the appended claims.

The invention claimed is:

1. A towing assembly comprising:
a) a recovery strap with a first end and a second end, said first end comprising a fastening element for connection to the connecting element of a towing vehicle or a vehicle to be towed, and said second end comprising a fastening element for connection to a connecting element of the other of the towing vehicle or the vehicle to be towed, and elongatable to a maximum length at failure;
b) a diffuser strap with a first end and a second end, a left side and a right side, said first end comprising a fastening element for connection to the connecting element of the towing vehicle or the vehicle to be towed and said second end comprising a fastening element for connection to the connecting element of the other of the towing vehicle or the vehicle to be towed; and
c) two or more non-overlapping sleeves disposed on the diffuser strap and sized to accept insertion of the recovery strap therethrough,
wherein the diffuser strap in its resting state is longer than the maximum length, or
wherein the diffuser strap is elongatable beyond the maximum length.

2. The assembly according to claim 1 wherein the diffuser strap in its resting state is longer than the maximum length.

3. A method of towing a vehicle in need of being towed, said method comprising:
a) providing a towing assembly as claimed in claim 2;
b) inserting the recovery strap through the two or more non-overlapping sleeves disposed along the length of the diffuser strap;
c) attaching the fastening element of the first end of the recovery strap to a connecting element of one of the vehicle or a towing vehicle;
d) attaching the fastening element of the second end of the recovery strap to a connecting element of the other of the vehicle or the towing vehicle;

e) attaching the fastening element of the first end of the diffuser strap to the connecting element of the vehicle or the towing vehicle;

f) attaching the fastening element of the second end of the diffuser strap to the connecting element of the other of the vehicle or the towing vehicle; and g) towing the vehicle.

4. The assembly according to claim 1, wherein the fastening elements of the recovery strap and the diffuser strap are loops formed at the ends of said recovery strap or said diffuser strap.

5. The assembly according to claim 1, wherein the two or more non-overlapping sleeves are affixed to the diffuser strap.

6. The assembly according to claim 1, wherein the two or more non-overlapping sleeves are affixed to the recovery strap.

7. The assembly according to claim 1, wherein the two or more non-overlapping sleeves are loops formed from the diffuser strap by folding the strap onto itself.

8. The assembly according to claim 1, wherein the two or more non-overlapping sleeves extend from the same side of the diffuser strap.

9. The assembly according to claim 1, wherein the two or more non-overlapping sleeves extend from different sides of the diffuser strap, alternating from said left side to said right side along the length of the strap.

10. The assembly according to claim 1, wherein the two or more non-overlapping sleeves can be opened and closed, to insert the recovery strap therethrough.

11. The assembly according to claim 1, wherein the recovery strap, and/or the diffuser strap and/or the sleeves are made of nylon.

12. A method of towing a vehicle in need of being towed, said method comprising:

a) providing a towing assembly as claimed in claim 1;

b) inserting the recovery strap through the two or more non-overlapping sleeves disposed along the length of the diffuser strap;

c) attaching the fastening element of the first end of the recovery strap to a connecting element of one of the vehicle or a towing vehicle;

d) attaching the fastening element of the second end of the recovery strap to a connecting element of the other of the vehicle or the towing vehicle;

e) attaching the fastening element of the first end of the diffuser strap to the connecting element of the vehicle or the towing vehicle;

f) attaching the fastening element of the second end of the diffuser strap to the connecting element of the other of the vehicle or the towing vehicle; and g) towing the vehicle.

13. The method of claim 12, wherein the fastening elements of the diffuser strap are positioned over the fastening elements of the recovery strap, in the connecting element.

14. The method of claim 12 wherein the two or more non-overlapping sleeves are disposed on the diffuser strap, and in step (b) the recovery strap is inserted through a first sleeve of the two or more non-overlapping sleeves disposed at an end of the diffuser strap, and the recovery strap is then coiled around said diffuser strap before inserting said recovery strap through each consecutive sleeve of the two or more non-overlapping sleeves disposed on the diffuser strap.

15. The method of claim 12 wherein the two or more non-overlapping sleeves can be opened and closed, and the recovery strap is inserted into the sleeves by opening the sleeves, positioning the recovery strap into the sleeves and then closing the sleeves around the recovery strap.

16. A towing assembly comprising:

a) a recovery strap with a first end and a second end, said first end comprising a loop for connection to a connecting element of a towing vehicle or a vehicle to be towed, and said second end comprising a loop for connection to a connecting element of the towing vehicle or the vehicle to be towed, and elongatable to a maximum length at failure;

b) a diffuser strap that is longer in its resting state than the maximum length, and that comprises a first end and a second end, a left side and a right side, said first end comprising a loop for connection to the connecting element of the towing vehicle or the vehicle to be towed and said second end comprising a loop for connection to the connecting element of the towing vehicle or the vehicle to be towed; and c) at least four sleeves disposed on the diffuser strap, said sleeves being sized to accept insertion of the recovery strap therethrough.

17. The assembly of claim 16 wherein the recovery strap, the diffuser strap, or both, are made of nylon.

18. The assembly of claim 16 wherein the at least four sleeves are disposed every four to five feet along the length of the diffuser strap.

19. The assembly according to claim 16, wherein the at least four sleeves extend from the same side of the diffuser strap.

20. The assembly according to claim 16, wherein the at least four sleeves extend from different sides of the diffuser strap, alternating from said left side to said right side along the length of the diffuser strap.

* * * * *